United States Patent Office 3,322,679
Patented May 30, 1967

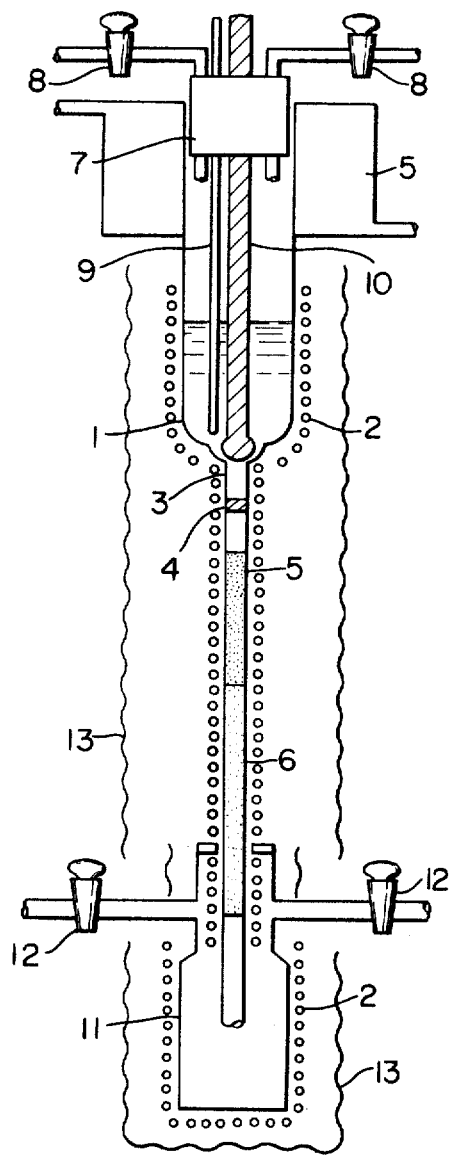

3,322,679
PROCESS FOR REPROCESSING BURNED URANIUM FUEL USING MOLTEN BATH CONTAINING AMMONIUM NITRATE
Yuichiro Kamemoto and Shigeru Yamagishi, both of Tokaimura, Naka-gun, Japan, assignors to Japan Atomic Energy Research Institute, Tokyo, Japan
Filed Sept. 2, 1965, Ser. No. 484,688
Claims priority, application Japan, Sept. 9, 1964, 39/51,801
5 Claims. (Cl. 252—301.1)

This invention relates to a process for reprocessing burned nuclear fuels by means of a molten salt bath containing ammonium nitrate or ammonium nitrate and other salts, and provides a novel reprocessing method simplified in operation and improved in separation efficiency.

As means for reprocessing used uranium nuclear fuels, distillation and electrolysis of chlorinated fuel materials have been proposed.

In the former method, burned uranium oxide fuel is converted to uranium tetrachloride (and chlorides of accompanying fisson products) by heating the fuel in contact with gaseous chlorine, and the chlorides are fractionated by distillation. But fractionation by this method is imperfect and uranium is not efficiently separated from fisson products.

In the latter method, burned uranium oxide fuel is dispersed in a molten salt bath (KCl and LiCl), chlorine gas is blown into the bath, and then produced chlorides are electrolysed in the bath. But in this method, a high decontamination factor is not expected.

According to this invention, burned uranium fuels are dissolved by being dipped in salt bath comprised of ammonium nitrate or ammonium nitrate and other salts (KCl, LiCl, NaCl, $KNO_3$, $LiNO_3$ or mixture thereof) and heated. The uranium oxide fuel is oxidized by the $NH_4NO_3$ and is dissolved in the salt bath. The molten salt mixture containing the uranium fuel material is then filtered with suitable filters (glass powder and $\gamma$-alumina or oxalate) to separate the fission products contained in the fuel, thereby the uranium fuel material being purified and recovered. The process of this invention is very simple in operation and superior in decontamination factor in comparison with the prior techniques.

The sole figure of the drawing shows the preferred apparatus for performing the method of the invention in elevational section.

In the figure, 1 is a reaction cell or vessel of Pyrex with heating coil 2 outside thereof, and the vessel is connected to a column 3, which is packed with quartz or glass fibre 4, glass powder 5, $\gamma$-alumina or calcium oxalate 6 in this order from the top of the column. Column 3 is also surrounded by a heating coil and is held at a temperature of about 160° C.

Vessel 1 is equipped with rubber stopper 7, outlets with cocks 8 thermocouple 9, and rod stopper 10.

The lower end of column 3 opens into a receptacle 11, which is also surrounded by heating coil 2, and is equipped with outlets with cocks 12. The whole apparatus is surrounded by heat insulating jacket 13.

Dimensions of this apparatus are as following: Volume of the reaction vessel is about 200 ml., and that of the receptacle is also 200 ml. Length of the separation column is about 20 cm., and its inside diameter is 0.8 cm. There is no need to say that the volume of the reaction cell and of the receptacle can be varied according to the mass of burned fuel to be treated. For packing stuff, commercially available calcium oxalate (anhydrate or monohydrate) of reagent grade or commercially available $\gamma$-alumina for chromatography were used as they were. Particle size was not measured.

This invention is now illustrated by examples.

*Example 1*

An irradiated $UO_2$-Graphite pellet (5 g., 5 w./w. percent $UO_2$ and 95 w./w. percent graphite by original composition) was added to 30 grams of molten ammonium nitrate and the mixture was heated in cell 1 at about 230° C. The pellet readily disintegrated, $UO_2$ was oxidized by ammonium nitrate and dissolved, graphite powder floated on the surface of the molten bath, and some portions of Kr, Xe, I, Ru evolving among the fission products the decomposition products of $NH_4NO_3$ were removed through cock 8. In this stage, nearly 100% of Kr, Xe and I and 5–10% of Ru were removed from the bath. Stopper 10 was raised, and then the molten salt went down through the column, where graphite was first separated by filter 4, then Zr–Nb among the fission products contained in the fuel was selectively collected by glass powder 5 usually 100% of Zr–Nb was collected with glass powder, and further, rare earth elements were removed by calcium oxalate packing. Eighty to ninety percent of the rare earth were removed by calcium oxalate 6. During the filtration, the oxalate part of the column was kept at about 180° C. so as to avoid decomposition of oxalate. The remaining fuel materials were collected in receptacle 11, then the bath was supplied with 25 g. $KNO_3$ and 25g. $LiNO_3$ and was heated at about 400° C. Then the remaining portions of Kr, Xe, I and Ru among the fission products, and decomposition products of $NH_4NO_3$ were removed as gaseous evolutions through cock 12 Uranium was recovered as a uranium compound precipitate, while Ba–La, Cs and all other fission products which had passed the column were left in the molten bath in receptacle 11. By this operation all the fission products were almost completely removed and the uranium was recovered. The chemical form of the above-mentioned uranium compound precipitate is still not clearly known. But by the activation analysis of each component it was recognized that the compound has a structure approximately $M_2U_2O_7$ (M represents an alkali metal). The chemical forms of the separated Zr–Nb, rare earths, Ba–La, and Cs are not yet clearly known, either. But all these elements, together with Kr, Xe, I and Ru are identified by $\gamma$-ray spectrometry, and the above-mentioned separation (retention) percentages were determined by comparison of analyses by $\gamma$-ray spectrometry before and after the separation with the above-mentioned column. The glass powder in which Zr–Nb had been collected was taken out and treated with a bath comprising $KNO_3$ and $LiNO_3$ (50:50 by weight) and containing oxalic acid, and Zr–Nb was recovered as oxalate. The amount of oxalic acid to be incorporated in the salt mixture is 1% at least. In this experiment the calcium oxalate used was monohydrate.

The bath in the reaction vessel should be heated at least over 210° C., the decomposition temperature of $NH_4NO_3$, since decomposition thereof is required for oxidation of the uranium fuel. The ammonium nitrate remains in liquid form (as a melt) even when the temperature is raised to 280° C. or so, though it starts to decompose at 210° C. When volatilization loss is considered, the preferred temperature of the reaction bath is about 230° C.

In this example $KNO_3$ and $LiNO_3$ were supplied to the bath in the receptacle prior to heating the bath because $NH_4NO_3$ is easily decomposed, and volatilized, and the bath is heated as high as 400° C., the loss from volatilization is high. The salt mixture is used to lower the melting point.

The bath in the receptacle should be heated at least at 330° C. because the excess of $NH_4NO_3$ must be distilled away. The preferred temperature is about 400° C.

As stated before, with calcium oxalate, 80–90% of the rare earths are removed, but with γ-alumina, 100% of the rare earths are removed. Though 100% of the Zr-Nb is usually collected with glass powder, sometimes, e.g., in the case that too much uranium fuel is treated, only about 85% of the Zr-Nb is retained by glass powder. In such a case, γ-alumina can collect the remaining portion of the Zr-Nb, though the calcium oxalate cannot. This was contrary to the inventors' expectation. The mechanism by which glass powder and γ-alumina retain the Zr-Nb is still not clearly known.

In all the following examples, the same experiments were repeated. However, the salt bath employed contained $KNO_3$, $LiNO_3$ and other salts from the beginning, so addition of these non-volatile salts later was unnecessary. Further, in the following examples calcium oxalate anhydrate was used instead of monohydrate.

Example 2

An irradiated $UO_2$-graphite pellet (5 g., 5 w./w. percent $UO_2$ and 95 w./w. percent graphite) was added to 50 grams of a mixed molten salt bath which comprises 45 w./w. percent of $KNO_3$, 45 w./w. percent of $LiNO_3$ and 10 w./w. percent of $NH_4NO_3$. After the same operation as Example 1, approximately the same result as Example 1 was obtained, that is, a uranium compound precipitate, from which almost 100% of fission products had been removed, was recovered. The same experiment was repeated with varied salt bath compositions, and it was revealed that $NaNO_3$ is also available, but the content of $NH_4NO_3$ must be not less than 2.5 w./w. percent by weight, or 5 times as much as the amount of uranium in the uranium compound to be treated.

Example 3

An irradiated $UO_2$ pellet (1 g.) was added to a 50 g. of mixed molten salt comprising 35 w./w. percent $KNO_3$, 35 w./w. percent $LiNO_3$, 28 w./w. percent $NH_4NO_3$ and 2 w./w. percent KCl, and the same experiment as Example 1 was carried out. The result was approximately the same as that of Example 1, that is, a uranium compound precipitate, from which almost 100% of fission products had been removed, was obtained.

Example 4

An irradiated $U_3O_8$ pellet (1 g.) was added to a 50 g. of a mixed molten salt comprising 28 w./w. percent $NH_4NO_3$, 35 w./w. percent $KNO_3$, 35 w./w. percent $LiNO_3$, and 2 w./w. percent NaCl, and the same operation as Example 3 was repeated, and approximately the same result was obtained.

Examples 3 and 4 disclose salt mixtures containing chloride salts. Addition thereof has no particular meaning, but in this case ammonium nitrate might be evaporated more easily. In any case $NH_4NO_3$ should be used in an amount of not less than 5 times as much as the amount of uranium in the uranium compound to be treated.

Example 5

An irradiated 500 mg. piece of uranium metal was treated in the same way as in Example 2. Uranium metal was also oxidized and dissolved in the mixed salt bath.

A uranium compound precipitate identified as an tentatively $M_2U_2O_7$, from which almost 100% of the fission products had been removed, was recovered.

Example 6

An irradiated 500 mg. piece of UC was treated in the same way as in Example 2. The uranium carbide was easily disintegrated and dissolved in the bath. Carbon was liberated and floated on the surface of the bath and some portion thereof was vaporized as carbon monoxide and dioxide.

The same result as Example 5 was obtained.

Example 7

An irradiated 500 mg. piece of $UC_2$ was treated in the same way as in Example 2. The uranium dicarbide was disintegrated and dissolved in the bath as well as UC. The same results as in Example 5 was obtained.

What we claim is:

1. A method for reprocessing burned nuclear fuel in the form of metallic uranium, uranium carbides, $UO_2$, $UO_2$-graphite or $U_3O_8$ pellet, comprising dissolving the fuel pellets in a molten salt bath heated higher than 210° C., said bath being selected from the group consisting of $NH_4NO_3$ and $NH_4NO_3$ with alkali metal nitrates or chlorides or mixtures thereof, filtering said molten salt through a glass or quartz fibre filter, glass powder and γ-alumina or calcium oxalate packed in a column, heating the filtrate at least at about 300° C. or more in order to expel gaseous fission products, thereby obtaining uranium as a uranium compound precipitate.

2. A method claimed in claim 1 in which the mixed salt bath comprises ammonium nitrate only, and at least one alkali metal nitrate is added after filtration.

3. A method claimed in claim 1 in which the mixed salt bath comprises ammonium nitrate and at least one of said alkali metal nitrates and contains at least not less than 5 times as much ammonium nitrate as the amount of uranium to be treated.

4. A method claimed in claim 1 in which the mixed salt bath comprises ammonium nitrate and at least one of said alkali metal nitrates and chlorides and contains at least not less than 5 times as much ammonium nitrate as the amount of uranium to be treated.

5. A method of separating radiologically pure Zr-Nb from burned uranium nuclear fuel comprising: collecting the glass powder which has selectively retained Zr-Nb in the process described in claim 1, mixing said glass powder with a molten salt mixture comprising $KNO_3$ and $LiNO_3$ (50:50 by weight) and containing at least 1% by weight oxalic acid, said oxalic acid being contained in an amount of 1% at least, and separating the radiologically pure Zr-Nb from the glass powder.

References Cited

UNITED STATES PATENTS

| 2,869,983 | 1/1959 | Gruen | 23—325 |
| 3,258,429 | 6/1966 | Weed | 252—301.1 |
| 3,275,421 | 9/1966 | Karraker et al. | 252—301.1 X |

CARL D. QUARFORTH, *Primary Examiner.*

S. J. LECHERT, JR., *Assistant Examiner.*